United States Patent [19]

Anthony

[11] 4,273,102
[45] Jun. 16, 1981

[54] SOLAR ENERGY SYSTEM

[76] Inventor: Myron L. Anthony, 607 Agana Dr., Grand Junction, Colo. 81501

[21] Appl. No.: 43,232

[22] Filed: May 29, 1979

[51] Int. Cl.³ .................................................. F24J 3/02
[52] U.S. Cl. ..................................... 126/435; 126/419; 126/430; 126/432
[58] Field of Search ............... 126/417, 421, 422, 427, 126/428, 429, 430, 432, 435, 436, 437, 444, 445, 448; 62/401, 402, 2; 237/11; 417/300

[56] References Cited

U.S. PATENT DOCUMENTS

| | | | |
|---|---|---|---|
| 3,412,728 | 11/1968 | Thomason | 126/429 |
| 3,568,435 | 3/1971 | May | 417/300 X |
| 3,986,491 | 10/1976 | O'Hanlon | 126/450 X |
| 4,010,733 | 3/1977 | Moore | 126/450 X |
| 4,103,673 | 8/1978 | Woodward et al. | 126/422 X |
| 4,103,675 | 8/1978 | Bar-On et al. | 126/450 X |
| 4,121,565 | 10/1978 | Grisbrook | 126/429 |
| 4,123,003 | 10/1978 | Winston | 237/11 X |
| 4,154,220 | 5/1979 | Loth | 126/429 X |
| 4,209,007 | 6/1980 | Collins | 126/422 |

FOREIGN PATENT DOCUMENTS

49346 2/1939 France ..................... 126/448

Primary Examiner—James C. Yeung
Assistant Examiner—Larry Jones
Attorney, Agent, or Firm—Kinzer, Plyer, Dorn & McEachran

[57] ABSTRACT

A solar energy system employing high-pressure high velocity air as the primary heat transfer medium comprises a plurality of collector panels connected in parallel with each other in a closed loop that also includes an air compressor and a heat exchanger that is connected to external energy utilization means. A self-actuating temperature-responsive air flow control valve associated with each collector panel cuts off the air flow through the panel whenever the air temperature in the panel is below a minimum threshold value and allows an increasing air flow through the panel up to a maximum as the temperature increases, maintaining the output temperature from the collector panel essentially constant for widely varying conditions of solar radiation. An air feedback circuit connects the outlet of the compressor to its inlet, bypassing the collector panels, and includes a pressure-responsive feedback control valve to assure a relatively constant total flow through the compressor. In some of the system embodiments, a thermal store is incorporated in the closed loop. A preferred construction employs a thermal feedback comprising an air/air heat exchanger connected from the outlet of the compressor to its inlet. The preferred collector panel construction utilizes a metal foil radiation absorber/air heater mounted in housing having an insulated base with the front of the housing closed by a cover formed of a thin sheet of glazing material affording a multiplicity of corrugations of generally sinusoidal configuration extending longitudinally of the housing and a manifold at each end of the housing.

17 Claims, 15 Drawing Figures

SOLAR ENERGY SYSTEM

BACKGROUND OF THE INVENTION

A variety of solar energy utilization schemes have been used, with varying degrees of success, throughout recorded history. However, abundant fuel supplies have usually limited the use of this diffuse and often capricious energy source. On the other hand, it is apparent that increasing energy requirements may well make it necessary to resort to solar energy for a substantial portion of our total energy needs.

For solar energy utilization systems of greater sophistication than simple greenhouses and the like, both air and water have been proposed as the primary heat transfer medium. Water, with or without added antifreeze, offers the advantage of high density and high specific heat and hence has been employed in the majority of solar energy systems. These systems, however, present substantial potential freezeup problems. If antifreeze is employed there may be contamination difficulties at any interface with a potable water supply. Corrosion (rust, scale, etc.) presents another substantial problem. Furthermore, the economic advantages attendant upon the efficiency of water as a heat transfer medium may be offset by the cost of electrical controls for the pumps and control valves necessary to the system.

Although air, as a primary heat transfer medium, has the disadvantage of low density and low specific heat, it effectively minimizes and even eliminates many of these problems. Thus, with an air-based solar energy system, there are no problems of freezing or contamination of a water supply, and few or no difficulties with corrosion. The requirements for electrical controls may still be substantial, from an economic standpoint, but these can also be effectively minimized as described below.

Solar energy systems can be roughly categorized into three types with respect to end use temperature:
  low (80° to 100°)
  medium (100° to 140°)
  high (above 140°).

Low temperature recovery systems are most suitable for industrial pre-heating, swimming pool heating, and greenhouse applications. They overlap to some extent with medium temperature recovery systems, which are most practical for use with domestic hot water and space heating. Systems operating in the high temperature range are most frequently employed for steam generation and the more exotic uses such as metallurgical smelting. The present invention is principally concerned with the low and medium end use temperature ranges.

For low and medium end use temperatures, so-called "flat plate collectors" are usually preferred as the initial energy collection devices. In general, a flat plate collector includes a relatively planar enclosed solar radiation absorbing surface with a transparent glazing window, the absorbing surface being a part of a heat exchanger through which a heat transfer fluid is circulated. The collector is usually oriented to face toward the sun (south in the northern hemisphere) and at an angle to the horizontal such that its surface is normal to the incident solar radiation for mid-year (equinox) conditions. High temperature systems may shift the collectors to track movements of the sun, but such tracking systems are economically infeasible for low to moderate temperature installations. The fixed flat plate collectors usually employed in low and medium end use temperature systems intercept considerably less direct solar flux because, even under the best of conditions, they are accurately aligned with the sun for only a short portion of the solar day.

In the evaluation of solar energy systems, a frequently used measurement of efficiency is the ratio of actual recoverable heat energy from the collector to the known incident solar flux for optimum (noon) conditions. For example, if a given collector intercepts solar flux of 200 BTU per hour per square foot of collector surface and is capable of delivering 100 BTU per hour to an external energy utilization means for end use, the efficiency is said to be fifty percent. From a practical standpoint, there are several important variables having a direct bearing on actual operating efficiency of a solar energy system, and some of those variables are not accounted for in the conventional efficiency comparison.

Two of those variables are the absolute value of incident solar flux and the temperature difference ($\Delta T$) between the absorption element in the collector and the ambient air. Regardless of the construction employed for the collector, the efficiency of this portion of the system is directly proportional to the incident solar flux and is inversely proportional to the temperature difference. These two factors are pretty well accounted for by conventional efficiency measurements for actual noon-time conditions.

Another variable factor that affects efficiency is thermal loss from conduction or convection, at the collectors, and is generally dealt with by means of insulation. Good insulating practice can provide substantial improvements in efficiency. The glazing on the collector contributes worthwhile, and in some instances essential, insulation by providing a dead air space between the heat exchange portion of the collector and the ambient air. The type of absorption surface used in the collector may have a substantial bearing on its overall efficiency. Some surface coatings for the heat exchanger portion of the collector show a substantial increase in the ratio of absorption to reflection. On the other hand, for systems of small and moderate size, particularly those intended for domestic use, the use of high absorption coatings may entail costs that are excessive in relation to the improvements obtained.

A factor of considerable importance in the construction of the collector panels is the glazing. All glazing materials absorb some of the incident solar radiation, as much as ten percent in many cases. However, by far the most important loss from the glazing fixed flat plate collectors is due to the reflection from the glazing surface. On any smooth surface, the ratio of reflection to transmission increases rapidly as the angle of incidence of the solar radiation departs from the normal. For example, the reflection/transmission ratio of window glass is approximately five to one at an hour angle of three hours (45°). This situation continues to deteriorate as the incident angle becomes more acute. In fact, in terms of a solar day this factor alone may predominate over all of the others combined.

Reflection from the glazing surface has a critical effect on efficiency. As previously noted, "efficiency" data is normally obtained with the collector surface normal to the incident radiation. Though useful as a rough comparison, this determination of little value in terms of system design, sizing and performance evaluations and calculations because of the variations in the relative position of the sun, with low to moderate angles of incidence during most of the solar day. Consequently, much of the solar flux is reflected back into space and only a limited proportion reaches the heat absorber in the collector. This reduction is further compounded by decreases in solar flux associated with changes in the solar year. Thus, the net efficiency of a flat plate collector is materially reduced as compared with the normal determinations of efficiency, and may in fact be as low as 5% or 10% for a collector that tests 50% to 70% under standard idealized conditions. This is an area in which large gains may be made in solar energy recovery.

For effective use of air as a heat transfer medium, the movement of large volumes of air are essential. In most known solar energy systems using air as a primary heat transfer medium, these large volumes are moved at relatively low pressures, requiring large and expensive duct systems. It has also been customary, in solar energy systems using air as a primary heat transfer medium, to employ that air directly for end use purposes, as in space heating. In consequence, air used as the heat transfer medium becomes contaminated with grease, dust, lint, smoke, and the like. This frequently results in a material reduction in overall efficiency of the system and, ultimately, in a necessity for expensive cleaning.

SUMMARY OF THE INVENTION

It is a principal object of the present invention, therefore, to provide a new and improved solar energy system, particularly adapted for domestic uses in the low to medium end use temperature ranges, that effectively and inherently minimizes or eliminates the problems and difficulties referred to above.

It is a particular object of the present invention to provide a new and improved solar energy system that utilizes high pressure (1 to 10 inches water gauge) high velocity (2000 to 6000 feet per minute) air as the primary heat transfer medium, in a closed loop recirculating system that is not subject to contamination from external sources.

Another object of the invention is to incorporate self-actuating sensing and control means into a solar energy system that employs high pressure high velocity air as the primary heat transfer medium, controls that continuously adjust the air flow through the system collectors to maintain a constant discharge air temperature throughout the normal operating range of the system so that the collector is operated at its lowest possible temperature consistent with the anticipated end use temperature.

A feature of the invention is a self-actuated pressure responsive air flow control valve incorporated in a feedback circuit that bypasses the collectors of a solar energy system utilizing high pressure high velocity air as the primary heat transfer medium to maintain air flow at a constant volume through the compressor.

Another object of the invention is to recover heat generated by the air compressor or like air pump, in a solar energy system utilizing high pressure high velocity air as the primary transfer medium, to thereby increase the overall operating efficiency and end use temperature of the system.

Another principal object of the invention is to provide a new and improved solar energy collector panel, suitable for use in a system utilizing high pressure high velocity air as the primary transfer medium, in which the energy absorption and heat exchange portion of the collector panel is integral with the cooling air chase and provides an expanded surface area in intimate thermal contact with the heat transfer air stream, and in which the glazing of the collector panel minimizes reflection losses.

A further object of the invention is to provide a new and improved solar energy system that employs small, inexpensive ductwork, that is inexpensive to install and maintain, and that employs a minimum of electrical controls.

Accordingly, the invention relates to a solar energy system utilizing high pressure high velocity air as the primary heat transfer medium, comprising collector means for collection of radiant solar energy, comprising at least one solar energy collector panel having an air inlet and an air outlet, an air compressor having an air inlet and an air outlet, and energy utilization means, including an air/fluid heat exchanger having a heating air inlet, a cooled air outlet, a fluid inlet and a fluid outlet. A series of ducts, forming a closed loop, connect the collector panel air outlet to the compressor air inlet, the compressor air outlet to the heat exchanger heating air inlet, and the heat exchanger cooled air outlet to the collector panel air inlet. The system includes thermal flow control means, comprising a self actuating temperature responsive air flow control valve interposed in the loop in association with the collector means, for limiting the air flow through the collector means to a minimum whenever the air temperature in the collector means is below a minimum threshold value and for increasing the air flow through the collector means with rising temperature, up to a maximum flow whenever the air temperature in the collector means exceeds a given maximum threshold value, thereby maintaining the temperature of the air output from the collector means within a limited range between the two thresholds for a wide range of conditions of solar energy impinging on the collector panel. Air feedback means are provided for maintaining a relatively constant air flow through the compressor, the air feedback means comprising an air feedback conduit effectively interconnecting the compressor air outlet back to its inlet, bypassing the collector means, the air feedback means further comprising a self-actuating pressure responsive feedback control valve interposed in the air feedback conduit.

DESCRIPTION OF THE PREFERRED EMBODIMENTS

Figures 1, 2A, 2B, 2C:
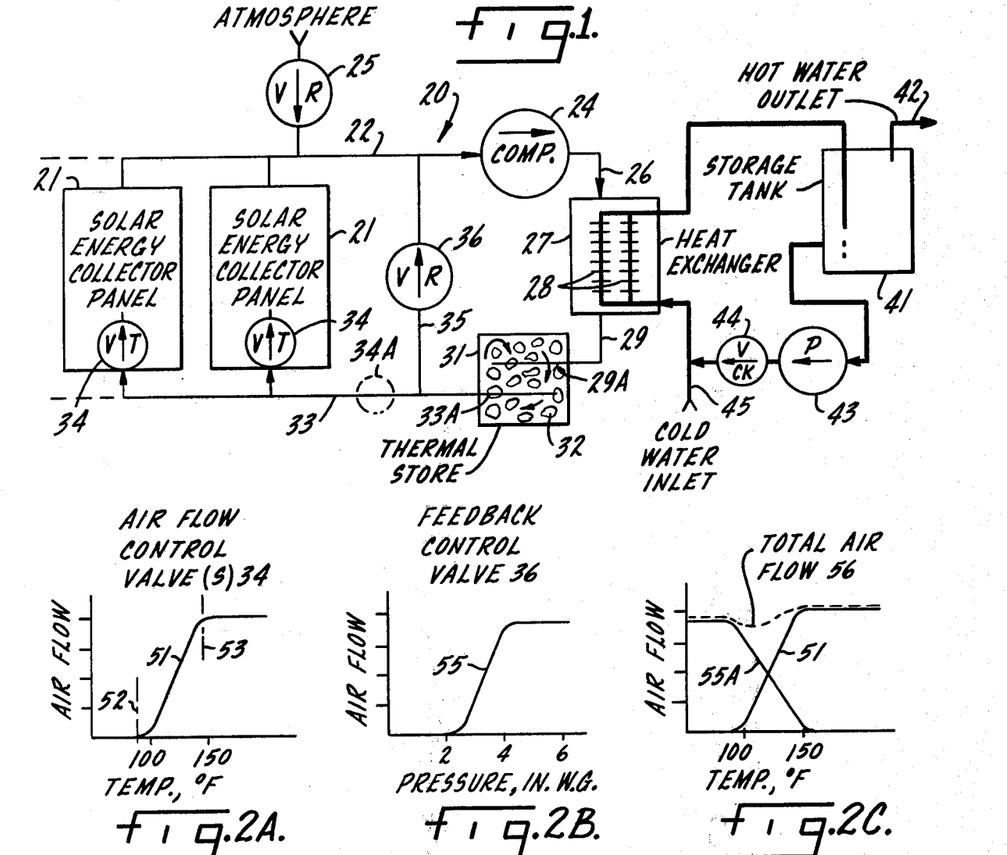
FIG. 1 is a schematic representation of a solar energy system constructed in accordance with one embodiment of the present invention.
FIGS. 2A, 2B and 2C are charts of the operating characteristics for air flow and feedback control valves incorporated in the system of FIG. 1.

FIG. 1 illustrates a solar energy system 20 constructed in accordance with one embodiment of the present invention; system 20 utilizes high pressure high velocity air as a primary heat transfer medium and operates in the low to medium temperature range (80°–140° F.) with respect to end use. System 20 comprises collector means for the collection of radiant solar energy, in this instance including two solar energy collector panels 21. A preferred construction for collector panels 21 is described hereinafter in connection with FIGS. 8–10. However, panels 21 may comprise any collector construction adapted to handling large volumes of air with reasonable efficiency. System 20 may include additional collector panels 21, depending upon the required system capacity.

The air outlet of each of the solar energy collector panels 21 is connected to a conduit 22 that is in turn connected to the inlet of an air compressor 24. A vacuum break pressure actuated check valve 25 is also connected to conduit 22, the inlet of valve 25 being open to the atmosphere. The air outlet of compressor 24 is connected by conduit 26 to a heat exchanger 27 which, in its simplest form, may comprise a closed chamber having an array of interconnected finned heat transfer tubes 28 located in the chamber. A honeycomb array, like an automobile radiator, can also be employed. In system 20, heat exchanger 27 is an air/water heat exchanger; in other applications an air/air exchanger may be employed.

The air outlet of heat exchanger 27 is connected to a conduit 29 that extends into a thermal store 31. As shown, thermal store 31 comprises an insulated chamber filled with a solid, particulate heat-retaining material that allows ready passage of air in and around the particles. The heat retention particles 32 in thermal store 31 may, for example, comprise small to medium sized rocks; wood chunks and other materials may also be employed. The portion 29A of conduit 29 that is located within thermal store 31 may be perforated throughout its length to distribute air through the thermal store. A similar construction may be used for the portion 33A of an outlet conduit 33 that extends from thermal store 31 to the inlet of each of the solar collector panels 21.

System 20 includes thermal flow control means for regulating the flow of air to the solar energy collector panels 21. In FIG. 1, this thermal flow control means comprises a self-actuating temperature responsive air flow control valve 34 interposed in the inlet of each of panels 21. The function of each of the valves 34 is to adjust the flow of air through its associated collector panel 21 to maintain a relatively constant output air temperature for the panel, regardless of changes in solar input. Each valve 34 is a negative feedback control. That is, a reduction in air temperature in one of the collector panels 21 results in adjustment of the associated valve 34 to reduce air flow through the panel, lowering the cooling rate, and thus acting to maintain an essentially constant output air temperature. Accordingly, although reduced solar input results in less total thermal throughput, whatever heat is available provides outlet air, flowing to conduit 22, at a temperature within a predetermined range for most operating conditions.

The solar energy system 20 of FIG. 1 further comprises an air feedback means for maintaining a relatively constant air flow through compressor 24 whenever the compressor is in operation. The air feedback means comprises a conduit 35 that effectively interconnects the outlet of air compressor 24 back to its inlet, bypassing the collector means comprising panels 21. A self-actuating pressure responsive one way feedback control valve 36 is interposed in the air feedback conduit 35. Valve 36 is approximately proportional in its operation, within a given range, relative to the inlet pressure to which it is subjected. The purpose of valve 36 is to maintain a more or less constant air flow through compressor 24 regardless of the changes in air flow through collector panels 21.

In the operation of solar energy system 20, FIG. 1, compressor 24 provides for circulation of air through the closed loop system comprising the conduits 22, 26, 29 and 33 and the feedback conduit 35. Because of the low density (about 0.075 lbs. per cubic foot) and low specific heat (about 0.24) of air, system 20 employs a high air pressure and high velocity. Preferably, the velocity of air movement in the closed loop system 20 is in the range of 2000 to 6000 feet per minute and the operating pressure is in the range of 1 to 10 inches water gauge. It is not intended, nor would it be recommended, that the closed system 20 be open to introduce air direct from the system into some utilization means such as a space heating system. The only change permitted in the circulating air is the introduction of additional air through valve 25 if necessary to prevent a negative pressure, relative to the atmosphere, at the inlet of compressor 24.

Solar radiation absorbed by collector panels 21 heats the high velocity air stream moving through the panels. The heated air is raised to a higher pressure and velocity as it passes through compressor 24, picking up some additional heat from the compressor. From compressor 24 the high pressure high velocity air stream flows into heat exchanger 27. In heat exchanger 27, a substantial portion of the heat in the air stream is transferred to a circulating fluid, in this instance water, flowing through the heat transfer tubing 28 in the heat exchanger. From heat exchanger 27, the heated water may flow to a storage tank 41 from which it can be drawn, as needed, through a hot water outlet 42. Circulation of water in the energy utilization means comprising tank 41 and heat exchanger 27 is provided by a pump 43; a check valve 44 precludes flow from the cold water inlet 45 direct to the tank 41 when the pump is off.

From heat exchanger 27, the partially cooled air stream flows through conduit 29 into thermal store 31. Residual heat in the air stream is transferred, at least in part, to the rocks or other heat storage particles 32 in the thermal store. Alternatively, a water tank incorporating an air/water heat exchanger may be utilized in place of thermal store 31.

When the circulating air in the closed loop of system 20 reaches the air flow control valve 34 at the inlet of one of the collector panels 21, it has already been cooled to a substantial extent. As the air flows out of one of the valves 34 into the associated collector panel it expands, with further consequent cooling. Thus, system 20 assures effective cooling of the inlet air to the solar collector panels for a wide range of operating conditions, an important factor in maintaining efficient operation as discussed more fully below.

The purpose of each air flow control (throttle) valve 34 in the inlet of each panel 21 is to automatically control the air flow through the associated collector to maintain a generally constant distance temperature from the collector. This operational feature is important to overall system performance because, during periods of reduced or intermittent solar energy input, the amount of circulated air should be properly adjusted to maintain optimum operating temperatures. Low solar input should result in reduced air flow while still delivering air in a controlled temperature range. This enables system 20 to extract usable solar energy, even in small amounts, during solar conditions of moderate cloud cover, low solar angle, and even diffuse general sky radiation.

A further function of the air flow throttle valve 34 is to establish a back pressure on air compressor 24 under reduced solar input conditions, thereby enhancing the pressure and temperature rises effected by the compressor, and to rapidly expand the compressed air into the higher volume represented by the collector panels. This expansion, as noted, results in a reduction of air temperature at the collector input which improves the overall collector efficiency, based on a material reduction in conduction losses and on a fourth power reduction in radiation losses from the collector panel. The latter relationship is such that even a ten degree (10° F.) reduction in collector operating temperature will result in an efficiency improvement of the order of ten percent. A working collector array for a system of given capacity can be reduced in size and cost accordingly.

A typical operating characteristic 51 for one of the air flow control/throttle valves 34 is shown in FIG. 2A. As shown by curve 51, valve 34 remains closed until the temperature in the associated collector panel reaches a low threshold temperature of useful solar input. In FIG. 2A, this minimum threshold 52 is about 85° F.; in some applications the valves 34 may be adjusted to open at a substantially higher minimum threshold, up to about 115° F. above the minimum threshold, the valve opens gradually, then continues to open at a higher rate until it reaches its full open condition, shown as 100% air flow, at a maximum threshold 53, in this instance about 145° F. Again, however, the maximum threshold may vary with system requirements. The resulting proportional modulation of the air flow through the collector panels insures maximum recovery of incident solar energy consistent with the requirements of the end use temperature and the collector temperature/efficiency characteristics, throughout the solar day.

The general response characteristic 55 of the feedback control valve 36 is shown in FIG. 2B. Valve 36 is fully closed when there is full circulation through the collector panels, with their throttling valves 34 completely open. The pressure response curve 55 for valve 36 is quite steep, opening and rapidly increasing the bypass air flow with only a relatively small incremental increase in operating pressure. Generally speaking, maximum bypass air flow is provided with a pressure increase of between fifty and one hundred percent.

FIG. 2C illustrates a typical combined air flow characteristic resulting from the operations of the air flow control valves 34 and feedback control valve 36. In FIG. 2C, curve 51 is the same as in FIG. 2A, curve 55A shows the operation of valve 36 resulting from pressure changes caused by fluctuations in the condition of valve 34, and total air flow is represented by the dash line 56. As shown in FIG. 2C, the total bypass air flow is preferably restricted, being slightly less than the total flow through the collector panels when the latter are warm enough for maximum flow.

In system 20, FIG. 1, the individual thermally responsive air flow control valves 34 could be replaced by a single master valve at the position 34A in duct 33. However, the use of a single master air flow control valve presents some problems and difficulties. Thus, a remote temperature sensing arrangement in one of the collector panels 21 becomes a necessity. If an electrical sensor and an electrically controlled valve are utilized, this may add materially to the cost of the system. An optional arrangement would be to provide a continuous feedback leak through the master control valve, sufficient to permit sensing of collector temperature. This arrangement, however, is not as effective and does not provide the same level of control as with the illustrated individual control valve 34 in each collector panel 21. Moreover, the master control valve arrangement is not desirable in any system that employs an air-thermal store, such as store 31, because the feedback circulation would reverse the heat flow from the store to a cold collector, being open at all times. In addition, the individual control valves 34 afford a substantial advantage, in comparison with a single master valve, with respect to improved air balance throughout a plural collector array. Some imbalance in air distribution through individual collectors is almost inevitable due to duct construction details, venturi effects, and standing waves, all common in high velocity systems. Individual panel air flow control valves are virtually essential if the collector panels are aligned differently (e.g., some facing southeast, some due south, and some southwest). Overall, individual valves produce an appreciable improvement in system performance.

Figures 3, 4:
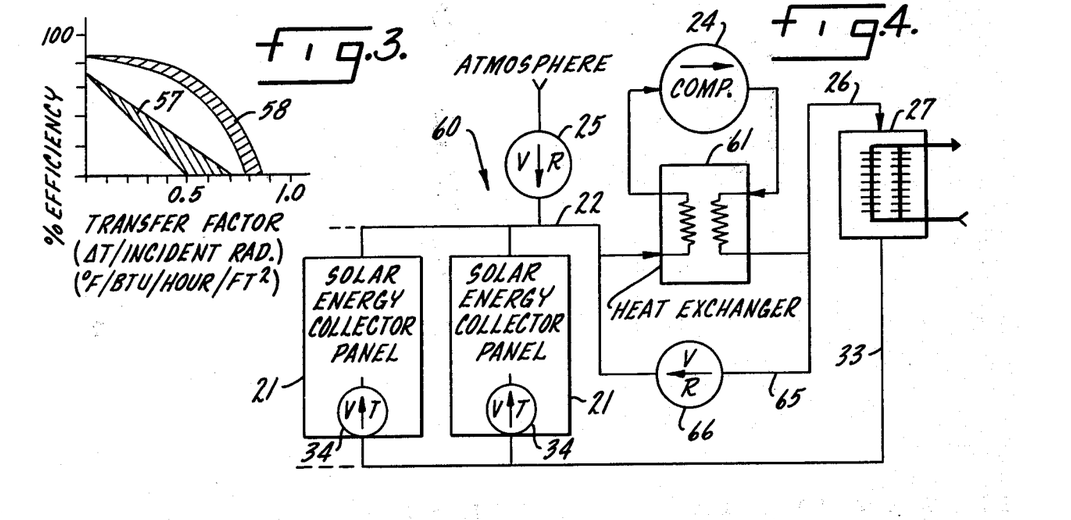
FIG. 3 is a comparative chart of operating efficiencies for the system of FIG. 1 and prior art systems.
FIG. 4 is a schematic diagram of a modification of the system of FIG. 1.

FIG. 3 presents a generalized representation of efficiency characteristics of the present system as compared with many previously known systems. In FIG. 3, efficiency is plotted as a function of the transfer factor determined by dividing the temperature differential $\Delta T$ between the collector absorber and the surrounding ambient temperature by the incident solar radiation. For many conventional systems, the result is a series of straight line functions encompassed within the shaded area 57. For the systems of the present invention, the corresponding characteristics comprise a family of curves represented by the shaded area 58. As can be seen from FIG. 3, the area under the curve 58 represents a highly advantageous range of operations as compared with the substantially diminished area under the curves 57. This substantial improvement is effected by a variety of factors, including the modulated, proportional control of coolant flow in the systems of the present invention, rapid response due to low thermal collector and system thermal mass, constant efficiency relative to time of day, a high basic heat transfer capacity derived from the use of high velocity air as the heat transfer medium, and an extended useful recovery range relative to and including a high transfer factor. In practical terms, this improvement is reflected directly and proportionally in improved system cost and thus in the cost of collection of solar energy.

Referring again to system 20, FIG. 1, it can be seen that the return air to collector 21 increases in temperature as the temperature of the storage tank 41 in the utilization system increases. This will result in decreased collector efficiency as previously noted. However, thermal store 31, being located in the return air stream, assists in maintaining high collector efficiency by absorbing and storing residual heat for later use while returning the coldest possible air to be recycled through the collector panels. Changeover control from solar collection to drawing on the charged thermal store 31 is automatically and proportionally mediated by the same self-actuating control valves 34 and 36 that control collection of the thermal energy in the first place. For example, during periods of heavy cloud conditions or overnight conditions resulting in no solar input, system 20 continues to circulate air on demand, drawing heat from thermal store 31. Intermittent conditions calling for alternate charging or draw from thermal store 31 are effectively accommodated.

Figure 11:
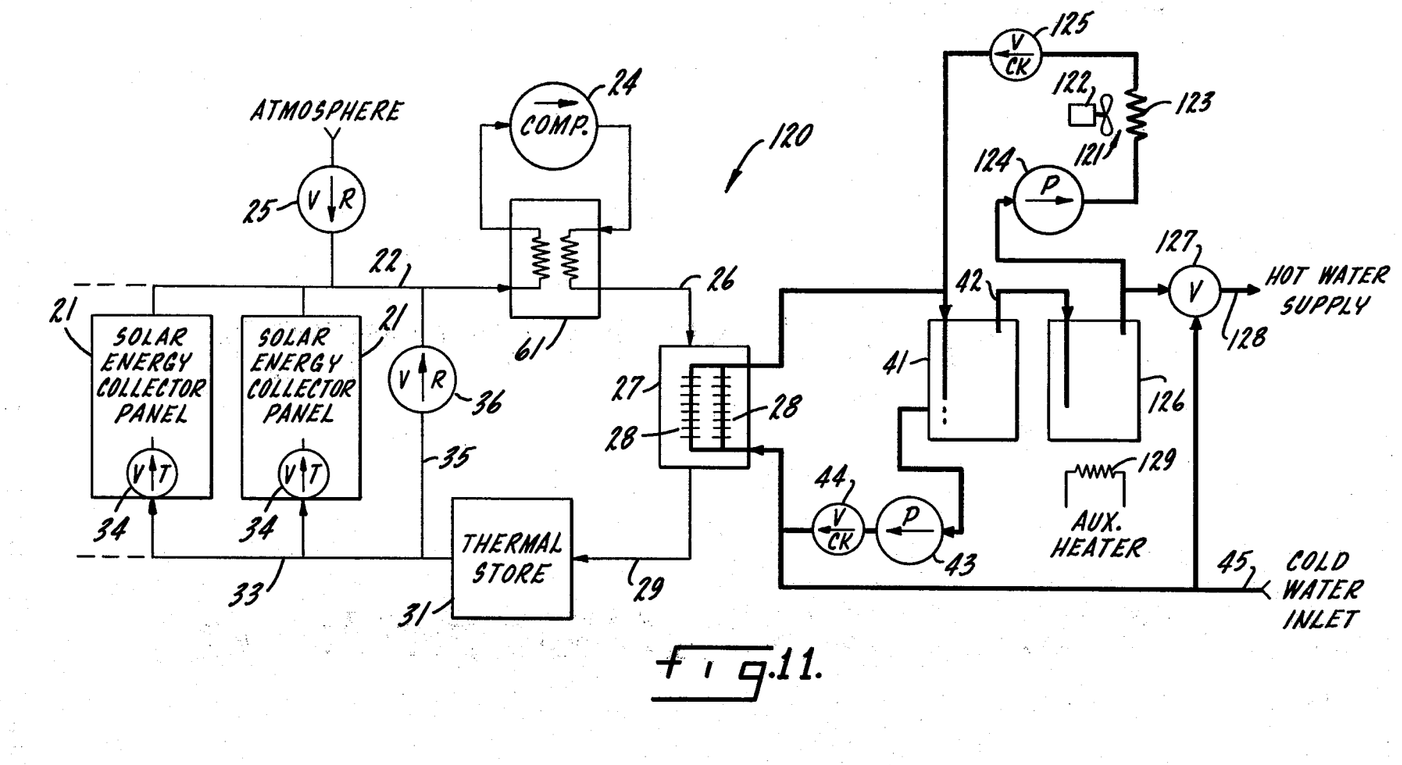
FIG. 11 is a schematic diagram of a system constructed in accordance with another embodiment of the invention.

In the energy utilization portion of system 20, the hot water outlet 42 is normally connected to a make-up hot water heater of conventional type as described more fully in connection with FIG. 11. Incoming cold replacement water is introduced into the system directly into the air/water heat exchanger 27 in order to take advantage of the extra cooling to the air flowing through the heat exchanger and to minimize the dilution of hot water in storage tank 41.

FIG. 4 illustrates a solar energy system 60 which in many respects corresponds to system 20 of FIG. 1. Thus, system 60 includes a plurality of solar energy collector panels 21, each panel having an air outlet connected to a conduit 22 that is in turn connected to a compressor 24 with the output of the compressor being supplied through a conduit 26 to the heat exchanger 27 leading to the energy utilization means of the system. The air outlet of heat exchanger 27 is connected directly by conduit 33 to the inlet of each of the solar collector panels to close the primary heat transfer loop; system 60 does not include the thermal store 31. As before, each panel 21 is equipped with a self-actuating thermally responsive air flow control valve 34 in its inlet.

In system 60, an air/air heat exchanger 61 is connected to the inlet and outlet conduits 22 and 26 for compressor 24. Heat exchanger 61 thus affords a thermal feedback means for preheating the air input to compressor 24. This arrangement makes it possible to operate the solar collector panels of system 60 at somewhat reduced temperatures, with increased efficiency, while still providing air to heat exchanger 27 at the desired end use temperature. In operation, the output from compressor 24, heated as a result of both compression and mechanical friction, is brought into heat exchanging relationship in exchanger 61 with the relatively cooler incoming air from collector panels 21. In exchanger 61, the air output from the compressor gives up a portion of its heat energy to increase the temperature of the incoming air, which in turn results in an increase in compressor output temperature in a continuous regenerative cycle. An overall increase in system efficiency is thus attained by avoiding the heat loss from compressor 24 that would otherwise occur.

Figure 5:
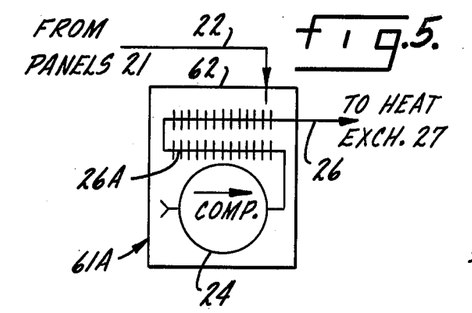
FIG. 5 is a detail schematic illustration of a preferred construction for a heat exchanger in the system of FIG. 4.

FIG. 5 shows one construction 61A that can be used for the air/air heat exchanger 61 of FIG. 4. Compressor 24 is positioned within a chamber 62 with its outlet connected to a finned heat exchange tube 26A located within the chamber. The input air from conduit 22 flows into chamber 62, in heat transfer relationship to the finned tube 26A, so that the air intake of the compressor is preheated.

In FIG. 4 the air feedback arrangement is modified somewhat as compared with FIG. 1. Thus, in system 60 the outlet conduit 26 of compressor 24 is connected back to the compressor inlet conduit 22 by an air feedback conduit 65 that bypasses heat exchanger 27 as well as the collector panels 21. A self-actuating pressure responsive feedback control valve 66 is interposed in conduit 65 and serves the same basic function as valve 36 in system 20. If a thermal store were incorporated in system 60, FIG. 4, corresponding to store 31 in system 20, FIG. 1, the air feedback circuit 35,36 of FIG. 1 is preferable.

The arrangement shown in FIG. 4, with the feedback control valve 66 connected directly across compressor 24, is preferred in systems that do not utilize a thermal store in the primary loop or that require a large temperature differential between the compressor and the collectors. The regeneration effect of heat exchanger 61 is maximized in this arrangement since the compressor air output is recirculated directly instead of through other portions of the closed primary loop. A regenerative temperature rise of as much as 25° F. can be achieved by this means.

Some consideration of the effect of compressor 24 on the overall system operation is in order. A reasonable approximation of the heat transfer capability of a compression-expansion thermal cycle is 12,000 BTU per hour per horsepower of mechanical input, depending to some extent on the working fluid and operating temperatures. A typical one horsepower high velocity compressor of the kind preferred for the systems of the present invention delivers about 890 cubic feet per minute in the operating range. This amounts to two tons of air per hour, the thermal equivalent of one thousand pounds of water. It is this relationship, taken in conjunction with the other invention features, that makes possible the high thermal transport and efficiency of the present invention. Based on these figures, and adding the heat equivalent of the one horsepower work input of the compressor at 2,545 BTU per hour, the temperature rise is:

$$\Delta T = \frac{12,000 + 2545}{4,000 \times 0.25} = 14.5° F.$$

The ductwork for the solar energy systems of the invention can be quite inexpensive. Duct diameters are usually small (2.5 to 6 inches). The conduits may be simple plastic piping, if the material employed will meet temperature requirements; foil lined externally coated paper tubing is also satisfactory. Thin wall metal ducts, preferably insulated, are also readily usable.

Figure 6A:
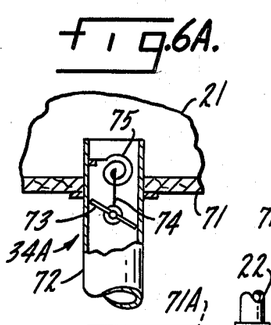
FIGS. 6A and 6B are simplified sectional views of different constructions that may be used for the air flow control valves in the solar energy systems of the invention.

FIG. 6A illustrates one construction that may be utilized for the self-actuating temperature responsive air flow control valves 34 in the systems of the invention. The valve 34A shown in FIG. 6A is mounted in the end wall 71 of the associated collector panel 21. Valve 34A comprises a tubular housing 72 which may be merely a continuation of duct 33 (FIGS. 1 and 4). A butterfly valve element 73 is mounted in housing 72 and is connected by a lever or crank linkage 74 to a coiled bimetal spring 75 anchored to housing 72. The bi-metal spring 75 is situated so as to be in good thermal communication with the interior of collector panel 21. Linkage 74 translates the contracting motion of spring 75 into rotation of butterfly 73 and also improves the thermal placement of the sensor spring 75. A preferred construction for butterfly 73 is effected by forming the butterfly in the configuration of a plane-cylinder intersection at an angle of about 20° from the normal to housing 72 to assure a non-sticking seal between the butterfly and the housing.

Figure 6B:
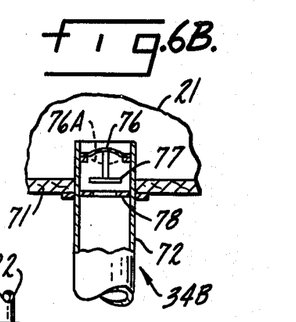

FIG. 6B illustrates another construction that can be used for the control valves 34. The valve 34B shown in FIG. 6B again comprises a housing 72 of tubular configuration that projects into the interior of the associated collector panel 21 through the end wall 71. An over-center snap-action bi-metal strap member 76 extends across housing 72 near the point of furthest projection of housing 72 into panel 21. The bi-metal sensor 76 is connected to and actuates a valve element 77 that is aligned with a valve seat 78. For a given cold calibration temperature, sensor 76 snaps to the configuration indicated by dash line 76A to close valve 34B. An increase in temperature above the threshold causes valve 34B to snap open. A rather narrow open-closed temperature differential of the order of 3° to 10° F. can be established and allows the valve to modulate the air flow to its associated collector panel 21 under varying solar conditions. This results in a close approximation of a continuous proportional air flow. The snap-action modulating valve 34B offers some advantages during periods of very weak solar input, such as early morning hours, permitting its collector panel to rest between bursts of cooling air, storing up energy and increasing the collector panel temperature to a usable degree.

Another construction that may be employed for the air flow control valves 34 is the wax cartridge thermally-actuated valve structure commonly employed in automotive cooling systems.

Figures 7A, 7B, 8, 9, 10:
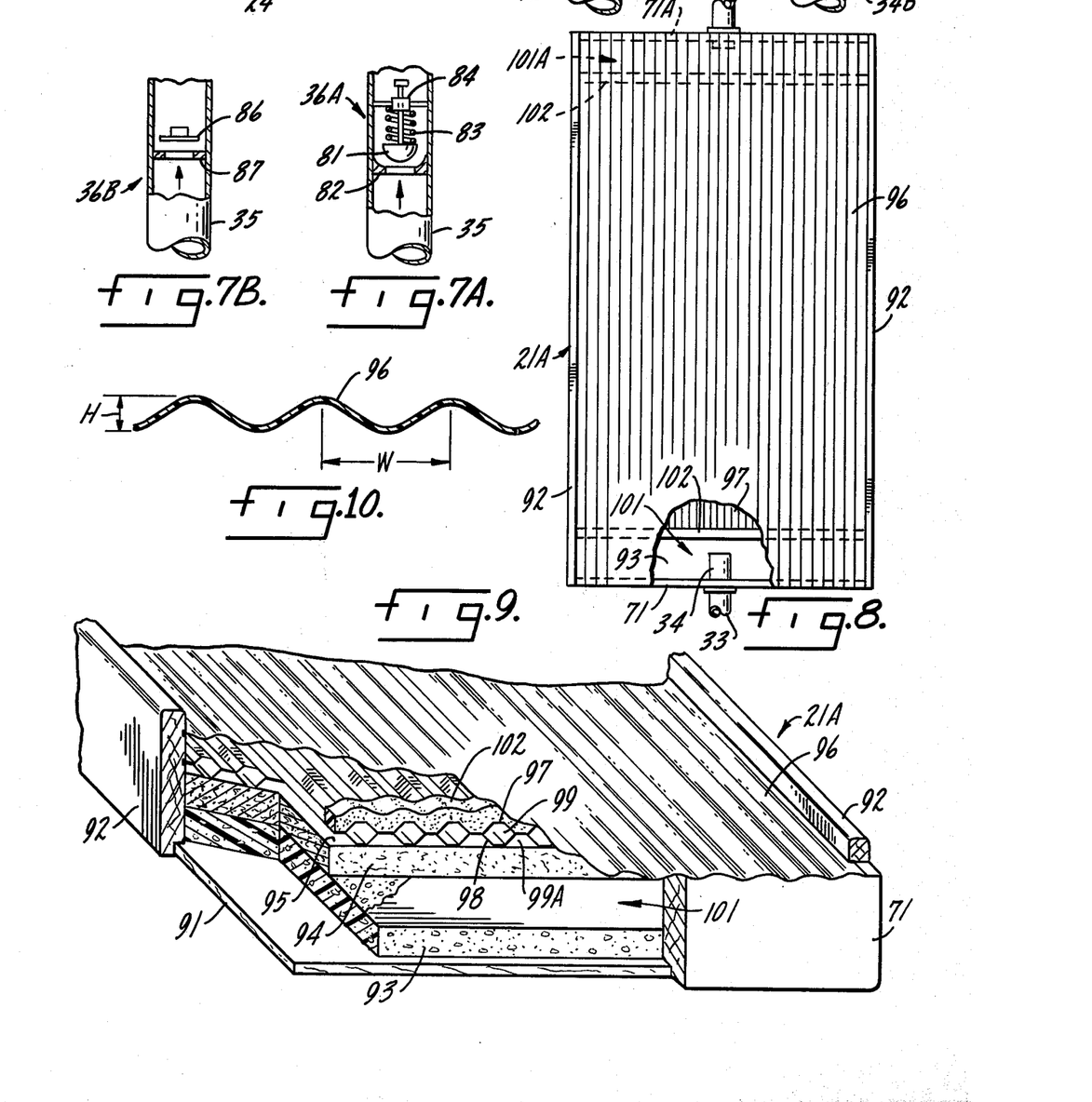
FIGS. 7A and 7B are simplified sectional views of valves usable as the feedback control valves in the systems of the invention.
FIG. 8 is an elevational view, partially cut away, of a solar energy collector panel of a preferred construction for use in the systems of the invention.
FIG. 9 is a detail perspective view, partly in cross section, of one end of the solar collector panel of FIG. 8.
FIG. 10 is a detail sectional view of the glazing for the panel of FIGS. 8 and 9.

FIG. 7A is a simplified illustration of a pressure-actuated check valve that can be utilized as the feedback control valve 36 (FIG. 1) or the corresponding feedback control valve 66 (FIG. 4). Valve 36A comprises a lightweight semi-hemispherical valve closure member 81 seating on a correspondingly shaped resilient, non-locking, non-sticking valve seat 82 within a valve housing indicated as a section of conduit 35. A spring 83, preferably with iso-elastic properties, urges the valve closure member 81 toward engagement with its seat 82. A "spider" support 84 is provided for spring 83 and closure member 81. Valve structure 36A permits installation of the feedback control valve in any orientation. This particular valve construction is especially suited to produce a response curve of the sort shown in FIG. 2B, with an increase in pressure effecting a desired increase in air flow.

A simpler feedback control valve structure 36B is shown in FIG. 7B. It consists essentially of a weighted valve closure member 86 and valve seat 87. Valve 36B can only be used in the orientation shown, since it is dependent upon gravity for operation. However, this valve construction is effective and provides an almost constant pressure regulation point regardless of throughput air flow within its operating range. Of course, it will be recognized that a variety of different valve structures can be used instead of the specific arrangements shown in FIGS. 6A, 6B, 7A, and 7B. However, certain design and construction restraints are involved in any of the control valves for the system. Valve seating must be non-locking and non-sticking, the valves must meet continuous operating temperature requirements up to 300° F., and factory calibration adjustments should be stable over extended periods of time.

FIGS. 8, 9 and 10 illustrate a preferred construction for the solar collector panels 21. Referring to FIGS. 8 and 9, each panel 21A comprises an open-front housing including a base 91, opposed end walls 71 and 71A, and side walls 92. The basic housing should be structurally durable; the side walls and end walls may be fabricated from a stable long-life wood such as redwood and the base 91 may comprise a sheet of high density particle board or marine plywood. The base should be amply insulated (R-19 preferred) with suitable materials capable of withstanding temperatures up to 300° F. for prolonged periods of time. As shown in FIG. 9, the base insulation may comprise two layers 93 and 94. By way of example, layer 93 may constitute a one inch layer of foamed polyurethane and layer 94 a one inch blanket of Fiberglass wool. Layer 94 has its upper surface covered with an aluminum reflector foil 95; a similar foil layer may be applied to the upper surface of insulator layer 93.

Panel 21A includes a transparent cover 96 that is mounted on and encloses the open front of the panel housing. Cover 96 is formed of a thin sheet of glazing material that is highly transparent to a broad range of solar radiation and affords high resistance to ultraviolet light; fiber-filled polyester is suitable. Cover 96 is formed with a multiplicity of shallow corrugations of generally sinusoidal configuration extending from one end of the panel housing to the other. A typical cross sectional configuration for the glazing cover 96 is shown in FIG. 10, in which dimension H is $\frac{3}{8}$ inch and dimension W is $2\frac{3}{8}$ inch. The ratio W:H is preferably of the order of 3:1 or more.

A combined radiation absorber and air heater is mounted in panel 21A, between the base insulator layer 94 and the glazing cover 96. The absorber/heater comprises two sheets of deep-rib formed and embossed aluminum foil 97 and 98, joined together to form a multiplicity of heat exchanger air passages 99 and 99A extending from one end of the panel to the other. The outer foil 97 should have a heat-absorptive coating; virtually any flat black finish that is stable up to 300° F. is acceptable. The upper insulation layer 94 and the radiation absorber/heater 97,98 are both made substantially shorter than the overall length of panel 21A and are so positioned in the panel housing that two manifolds 101 and 101A affording access to the heat exchanger air passages 99, 99A are formed at the opposite ends of the panel. The air inlet conduit 33 is connected through the one end wall 71 of panel 21A, terminating in valve 34 located within the manifold 101. The outlet conduit 22 for the panel is connected through the other end wall 71A into manifold 101A. Suitable gaskets 102 are provided at the opposite ends of panel 21A to seal the ends of the air space between the glazing cover 96 and the absorber/heater 97,98.

The basic purpose of the illustrated construction for collector panel 21A is to realize the maximum possible heat transfer capacity between the solar heat absorbing surface afforded by the outer foil 97 of the radiation absorber/heater and the heat transfer fluid, the air that flows through passages 99 and 99A. This objective is effectively realized in the construction shown in FIGS. 8–10. Thus, there is a very short thermal path, generally about 0.018 inch of high thermal conductivity material through the foil layer 97 to the main air passages 99. The illustrated construction affords a rigid and structurally sound assembly, yet attains a substantial increase in air contact surface area (about 2.5) as compared with the flat projected area of the absorber/heater. The high velocity movement of air through the passages 99 and 99A provides for a high rate of thermal exchange, which is also aided by the natural air turbulence through the passages. Air flow through the collector panel is from one end to the other, from manifold 101 to manifold 101A; as described in connection with FIGS. 1 and 4, the collector panels are preferably connected in parallel to minimize the end-to-end temperature rise through the panels and to minimize the air pressure drop through the collector array. Series connection of the collector panels or internal baffling to permit input and output connections at one end of a panel are advisable only in unusual situations where a maximum temperature rise is required, because these arrangements may result in a serious reduction in overall collector efficiency. Series feeding also involves greater air friction losses and a consequent requirement for higher operating air pressures.

The glazing material can be critically important. The construction illustrated for panel 21A is highly advantageous in several respects. The corrugated configuration is structurally sound and has a high load-bearing capacity for snow or the like. It is preferable that the glazing cover the upper surface of the end walls 71 and 71A, as shown in FIGS. 8 and 9, for effective drainage. The glazing affords high radiation dispersion and transparency, and is highly resistant to damage from storms or acts of vandalism. Preferably, a high proportion of glass reinforcing fibers should be employed in the glazing 96 to attain maximum strength, and ultraviolet light inhibitors should be dispersed throughout the resin base to minimize radiation degradation and loss of transmission properties over an extended life.

The sinusoidal geometry of the corrugated glazing 96 affords an added advantage because it continuously presents a surface that is generally normal to incident radiation over a wide range of horizontal angles of the sun. In consequence, the loss of recoverable energy due to reflection is greatly reduced as compared with a flat surface. Thus, the collector panel 21A affords a relatively high constant efficiency throughout most of a typical solar day, whereas a flat surface collector may vary by as much as ten to one over the same period.

FIG. 11 illustrates a complete solar energy system 120 that is basically similar to the system 20 of FIG. 1 except that the compressor 24 is provided with a regenerative heat exchanger 61 as in system 60 (FIG. 4). System 120 further comprises a water/air heat exchanger 121 including a fan 122 and a hot water coil 123 supplied by a pump 124 from the hot water outlet of a storage tank 126, the return line from coil 123 extending through a check valve 125 back to the cold water inlet of the initial storage tank 41. The hot water outlet 42 of storage tank 41 is connected to the inlet of tank 126, which is a make-up hot water heater. The hot water outlet of tank 126 is connected through a mixing valve 127 to an outlet 128 that affords a domestic hot water supply. Valve 127 may be provided with a tempering cold water connection from the cold water inlet 45.

In the operation of system 120, solar energy is absorbed in the collector panels 21 and transferred to a high velocity air stream moving through the panels. From the collector panels the solar heated air passes through conduit 22 and is further preheated in heat exchanger 61 before it reaches the inlet of compressor 24. The air, further heated by compression and heat regeneration (amplification) in compressor 24 and exchanger 61, moves at high pressure and high velocity through conduit 26 and into heat exchanger 27. In heat exchanger 27, a substantial portion of the heat in the air is transferred to water circulated through the loop comprising the heat exchanger coils 28, storage tank 41, pump 43, and check valve 44. The cooled air discharged from heat exchanger 27 is fed to thermal store 31 where additional heat may be transferred to the storage medium. The air, still under relatively high pressure, returns to the collector panels through conduit 33 and the thermally responsive flow control valves 34. Rapid expansion of the air into the collector panels, in the inlet manifolds of those panels, affords a further decrease in air temperature for enhanced collector cooling and heat transfer capability. The pressure responsive feedback control valve 36 maintains the flow of air through compressor 24 essentially constant during periods of reduced collector air flow corresponding to intervals of reduced solar input.

The temperature of the water in the thermal storage tank 41 increases throughout the solar day, depending upon solar energy input and the amount of heat withdrawn from the system. Under conditions of high solar input and low demand the temperature in storage tank 41 may rise to as high as 150° F. The heated water from store 41 is fed to tank 126, which includes an auxiliary heater 129 to heat the water to the desired end use level, usually about 130° to 150° F., when necessary. Hot water from tank 126 is distributed for domestic use by means of mixing valve 127. Hot water from tank 126 is also circulated to the space heating heat exchanger 121 by means of pump 124 to afford forced hot air space heating on demand.

In system 120, as well as in systems 20 and 60, some electrical controls are required. With respect to the primary heat transfer loop using high pressure high velocity air as the transfer medium, the only element of the system requiring electrical control is compressor 24. That control may be quite conventional, actuated by one or more thermostats. For example, compressor 24 (and water pump 43) may be turned on in response to an appropriate temperature level in one or more of the collector panels or a demand for hot water and may be turned off if the collector panel is at an undesirably low temperature and the thermal store 31 is also at a reduced temperature. The controls for auxiliary heater 129 and pump 124 may, of course, be entirely conventional.

I claim:

1. A solar energy system utilizing high pressure high velocity air as the primary heat transfer medium, comprising:

collector means for collection of radiant solar energy, comprising at least one solar energy collector panel having an air inlet and an air outlet;

an air compressor having an air inlet and an air outlet;

energy utilization means, including an air/fluid heat exchanger having a heating air inlet, a cooled air outlet, a secondary fluid inlet and a secondary fluid outlet;

a series of ducts, forming a closed loop, connecting the collector panel air outlet to the compressor air inlet, the compressor air outlet to the heat exchanger heating air inlet, and the heat exchanger cooled air outlet to the collector panel air inlet;

thermal flow control means, comprising a self actuating temperature responsive air flow control valve interposed in the loop in association with the collector means, for limiting the air flow through the collector means to a minimum whenever the air temperature in the collector means is below a minimum threshold and for increasing the air flow through the collector means as the air temperature in the collector means rises above the minimum threshold, up to a maximum flow whenever the air temperature in the collector means exceeds a given maximum threshold, thereby maintaining the temperature of the air output from the collector means within a limited range for a wide variety of solar radiation conditions;

and air feedback means for maintaining a relatively constant air flow through the compressor, the air feedback means comprising an air feedback conduit effectively interconnecting the compressor air outlet back to its inlet, bypassing the collector means, the air feedback means further comprising a self-actuating pressure-responsive feedback control valve interposed in the air feedback conduit.

2. A solar energy system according to claim 1, and further comprising:

thermal feedback means, comprising an air/air heat exchanger connected to the inlet and the outlet of the compressor, for pre-heating the input air to the compressor.

3. A solar energy system according to claim 1 and further comprising:

an air-operated thermal store, interposed in the loop between the energy utilization means and the collector means.

4. A solar energy system according to claim 3 in which the thermal store comprises an insulated chamber having an air inlet and an air outlet and filled with a solid, particulate heat-retaining material.

5. A solar energy system according to claim 2 and further comprising:

an air-operated thermal store, interposed in the loop between the energy utilization means and the collector means.

6. A solar energy system according to claim 5 in which the thermal store comprises an insulated chamber having an air inlet and an air outlet and filled with a solid, particulate heat-retaining material.

7. A solar energy system according to claim 1, claim 2, claim 3, or claim 5, in which the collector means comprises a plurality of collector panels connected in parallel with each other.

8. A solar energy system according to claim 7 in which each collector panel comprises:

an open front housing including a base, opposed end walls, and opposed side walls;

a base insulator comprising a layer of thermal insulation covering the housing base;

a cover, mounted on the front of the housing, formed of a thin sheet of a glazing material highly transparent to a broad range of solar radiation, the cover including a multiplicity of corrugations of generally sinusoidal configuration extending from one end of the housing to the other;

an air/air heat absorber/exchanger mounted in the housing between the base insulator and the cover and spaced from the cover by a sealed air space, the heat exchanger comprising a thin, thermally conductive material having a high radiation absorption characteristic forming a multiplicity of air passages extending from one end of the housing to the other;

and system connection means, comprising a manifoled at each end of the housing, for circulating high pressure, high volume air through the heat exchanger.

9. A solar energy system according to claim 7 in which the thermal flow control means includes a plurality of self-actuating temperature-responsive control valves, one for each collector panel.

10. A solar energy system according to claim 9 in which the control valve for each collector panel comprises a bi-metal actuator connected to a movable valve element.

11. A solar energy system according to claim 9, in which the control valve for each collector panel is mounted within the panel.

12. A solar energy system according to claim 11 in which the control valve for each collector panel is located in the air inlet for that panel.

13. A solar energy system according to claim 12 in which the control valve for each collector panel comprises a bi-metal actuator connected to a movable valve element.

14. A solar energy system according to claim 1, claim 2, claim 3, or claim 5, in which the air feedback conduit also bypasses the energy utilization means and any thermal store present in the system.

15. A solar energy system according to claim 1, claim 2, claim 3, or claim 5, in which the pressure-responsive feedback control valve comprises a vertically-oriented valve including a weighted movable valve element.

16. A solar energy system according to claim 1, claim 2, claim 3, or claim 5, in which the pressure-responsive feedback control valve comprises a spring-loaded ball check valve.

17. A solar energy system according to claim 1, claim 2, claim 3, or claim 5, in which the heat exchanger in the energy utilization means is an air/water heat exchanger, the energy utilization means further comprising:

a water-operated thermal store connected to the water outlet of the energy utilization heat exchanger;

and pump means for recirculating water from the water-operated thermal store back through the energy utilization heat exchanger.

* * * * *